(12) United States Patent
Son (10) Patent No.: US 7,511,741 B2
(45) Date of Patent: Mar. 31, 2009

(54) METHOD OF MANAGING DATA-FILES USING REPRESENTATIVE VOICE IN PORTABLE DIGITAL APPARATUS

(75) Inventor: Hyuk-soo Son, Seongsnam-si (KR)

(73) Assignee: Samsung Techwin Co., Ltd. (KR)

( * ) Notice: Subject to any disclaimer, the term of this patent is extended or adjusted under 35 U.S.C. 154(b) by 900 days.

(21) Appl. No.: 10/665,109

(22) Filed: Sep. 18, 2003

(65) Prior Publication Data

US 2004/0058716 A1     Mar. 25, 2004

(30) Foreign Application Priority Data

Sep. 19, 2002     (KR) ...................... 10-2002-0057332

(51) Int. Cl.
*H04N 5/76* (2006.01)
(52) U.S. Cl. ................... 348/231.2; 348/231.4
(58) Field of Classification Search ............ 348/231.99, 348/231.2, 231.3, 231.4; 707/104.1, 100
See application file for complete search history.

(56) References Cited

U.S. PATENT DOCUMENTS

| | | | |
|---|---|---|---|
| 6,167,469 A | | 12/2000 | Safai et al. |
| 6,192,191 B1 * | | 2/2001 | Suga et al. ............... 348/220.1 |
| 6,380,975 B1 | | 4/2002 | Suzuki |
| 6,683,649 B1 * | | 1/2004 | Anderson ................ 348/231.6 |
| 6,721,001 B1 * | | 4/2004 | Berstis .................... 348/231.6 |
| 6,763,182 B1 * | | 7/2004 | Endo et al. .................. 386/124 |
| 6,829,624 B2 * | | 12/2004 | Yoshida .................... 348/231.4 |
| 6,954,229 B1 * | | 10/2005 | Otala ..................... 348/231.99 |
| 2002/0015100 A1 * | | 2/2002 | Shioji ......................... 348/231 |
| 2003/0118319 A1 * | | 6/2003 | Um et al. ....................... 386/52 |
| 2004/0019681 A1 * | | 1/2004 | Nakamura et al. .......... 709/226 |
| 2004/0056846 A1 * | | 3/2004 | Aizawa ...................... 345/173 |
| 2004/0179124 A1 * | | 9/2004 | Morimoto et al. ...... 348/333.02 |

FOREIGN PATENT DOCUMENTS

| | | | |
|---|---|---|---|
| JP | 2002091814 A | * | 3/2002 |
| KR | 1998-0067064 | | 10/1998 |
| KR | 1999-0049718 | | 7/1999 |
| KR | 10-0227535 | | 11/1999 |
| KR | 2001-0081247 | | 8/2001 |

OTHER PUBLICATIONS

Chinese Office Action; Mar. 10, 2006; 6 pages.

* cited by examiner

*Primary Examiner*—Lin Ye
*Assistant Examiner*—Jason Whipkey
(74) *Attorney, Agent, or Firm*—Park & Associate IP Law LLC (57) ABSTRACT

A method of managing user data-files in a portable digital apparatus capable of inserting and ejecting a recording medium and having a display device includes the steps of generating representative voice files and data-files in a particular (i.e., corresponding) directory according to manipulation of a user, indices according to an order of generation of the representative voice files and the data-files being sequentially included in names of the representative voice files and the data-files (a file generation step), grouping the data-files by unit of the representative voice file according to the indices of the representative voice files and the data-files (a group generation step), and displaying representative data-files of the respective groups in the particular directory and reproducing the representative voice file corresponding to a group to which the representative data-file selected by the user belongs (a display and reproduction step).

3 Claims, 12 Drawing Sheets

METHOD OF MANAGING DATA-FILES USING REPRESENTATIVE VOICE IN PORTABLE DIGITAL APPARATUS

CROSS-REFERENCES TO RELATED APPLICATIONS

This application claims priority from Korean Patent Application No. 2002-57332 filed on Sep. 19, 2002, in the Korean Intellectual Property Office, the disclosure of which is incorporated herein in its entirety by reference.

BACKGROUND OF THE INVENTION

1. Field of the Invention

The present invention relates to a method of managing user data-files in a portable digital apparatus, and more particularly, to a method of managing user data-files in a portable digital apparatus, for example, a digital camera, having a display device and using a recording medium which can be inserted in or detached from the portable digital apparatus.

2. Description of the Related Art

A portable digital apparatus, for example, a digital camera typically has a limited user input function. Hence, users cannot easily manage their data-files stored in the portable digital apparatus. Accordingly, users must use other apparatus such as a personal computer in order to manage data-files that are stored in a portable digital apparatus. Also, users must reproduce all of the data-files stored in a recording medium in order to search for a specific data-file.

SUMMARY OF THE INVENTION

To solve the above and/or other problems, the present invention provides a method of managing data-files in a portable digital apparatus, by which a user can easily manage one's own data-files without using other apparatuses.

The present invention provides a method of managing data-files in a portable digital apparatus by which user data-files can be automatically grouped in a particular directory and reproduced.

According to an aspect of the present invention, a method is provided of managing user data-files in a portable digital apparatus having a display device, and an interface for a recording medium, the method comprising the steps of: generating representative voice files and data-files in a corresponding directory through manipulation by a user, the representative voice files and data-files having respective names including sequentially arranged file indices based on the order of generation of the representative voice files and the data-files; grouping the data-files into groups of files in a manner such that each respective group is associated with its representative voice file based on the file indices of the representative voice files and the data-files; and selectively displaying on the display device representative data-files of one respective group in the corresponding directory. In certain embodiments, the step is provided of reproducing a representative voice file corresponding to a group to which the representative data-file selected by the user belongs.

In certain embodiments, in the file generation step, an index is assigned according to the order of generation of the representative voice files and the data-files. In certain embodiments, in the group generation step, the data-files are grouped by unit of the representative voice file according to the index of the data-files. In certain embodiments, in the reproduction step, the representative data-file and the representative voice file of each group are reproduced. Accordingly, a user of a portable digital apparatus can conveniently manage one's own data-files without using an additional apparatus. Also, the user data-files can be automatically or systematically grouped in the particular (i.e., corresponding) directory and reproduced.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
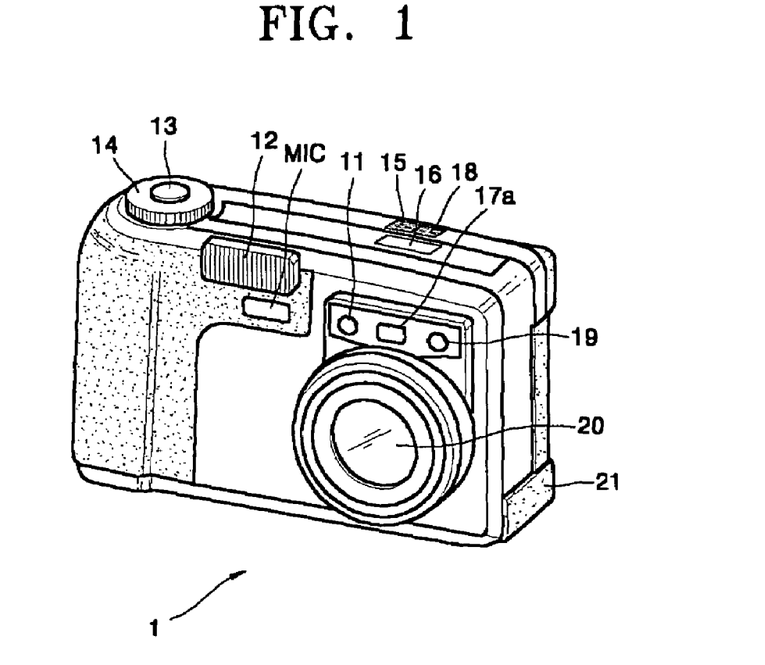
FIG. 1 is a perspective view illustrating the front side of a digital camera incorporating an embodiment of the present invention.

Referring to FIG. 1, a microphone (MIC), a self-timer lamp 11, a flash 12, a shutter button 13, a mode dial 14, a function selection button 15, a photography information display portion 16, a viewfinder 17a, a function block button 18, a flash light quantity sensor 19, a lens portion 20, and an external interface portion 21 are arranged adjacent to the front side of a digital camera 1 which is an embodiment of a portable digital apparatus according to the present invention.

The self-timer lamp 11 flickers in a self-timer mode during a set time after the shutter button 13 is pressed until the photographing starts. The mode dial 14 is used for a user to set a variety of modes, for example, a still image photographing mode, a night view photographing mode, a motion picture photographing mode, a reproduction mode, a computer connection mode, and a system setting mode. The function selection button 15 is used for the user to select a desired one from the operational modes of the digital camera 1, for example, the still image photographing mode, the night view photographing mode, the motion picture photographing mode, and the reproduction mode. The photography information display portion 16 displays information of the respective functions related to photography. The function block button 18 is used for the user to select each function displayed on the photography information display portion 16.

Figure 2:
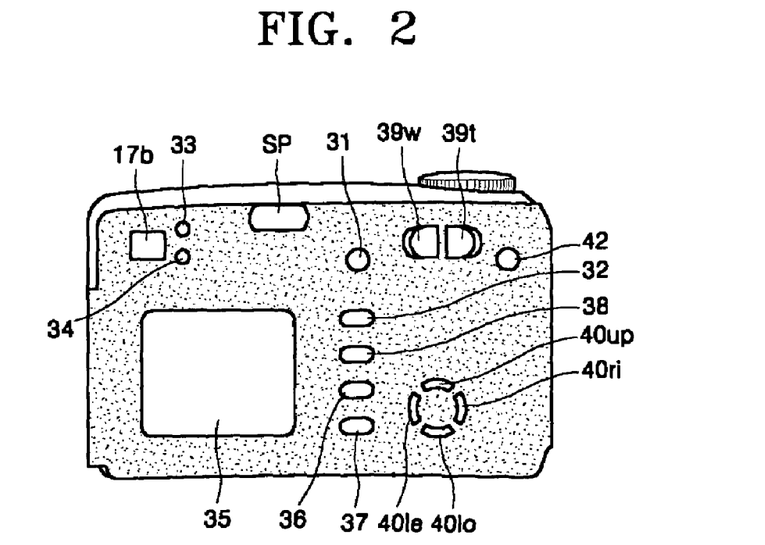
FIG. 2 is a view illustrating the rear side of the digital camera of FIG. 1.

Referring to FIG. 2, a representative voice button 42, a speaker SP, a power button 31, a monitor button 32, an auto-focus lamp 33, a viewfinder 17b, a flash ready lamp 34, a display panel 35, a confirmation/deletion button 36, an enter/reproduction button 37, a menu button 38, a wide angle zoom button 39w, a telephoto zoom button 39t, an upward movement button 40up, a rightward movement button 40ri, a downward movement button 40lo, and a leftward movement button 40le are arranged on the rear side of the digital camera 1 according to an embodiment of the present invention.

When the user presses the representative voice button 42, a representative voice request signal to generate a new directory and a representative voice file corresponding thereto is generated.

The monitor button 32 is used to control the operation of the display panel 35. For example, when the monitor button 32 is pressed at a first time, an image of an object pictured and photography information thereof are displayed on the display panel 35. When the monitor button 32 is pressed at a second time, only an image of the pictured object is displayed on the display panel 35. When the monitor button 32 is pressed at a third time, power applied to the display panel 35 is cut off.

The auto-focus lamp 33 is turned on when an input image is well focused. The flash ready lamp 34 is turned on when the flash 12 of FIG. 1 is in a ready state. The confirmation/deletion button 36 is used as a confirmation button or a deletion button in the process in which the user sets each mode. The enter/reproduction button 37 is used for the user to input data or to perform the function of stop or reproduction in a reproduction mode. The menu button 38 is used to display a menu of a mode selected by the mode dial 14. The upward movement button 40up, the rightward movement button 40ri, the downward movement button 40lo, and the leftward movement button 40le are used in the process in which the user sets each mode.

Figure 3:
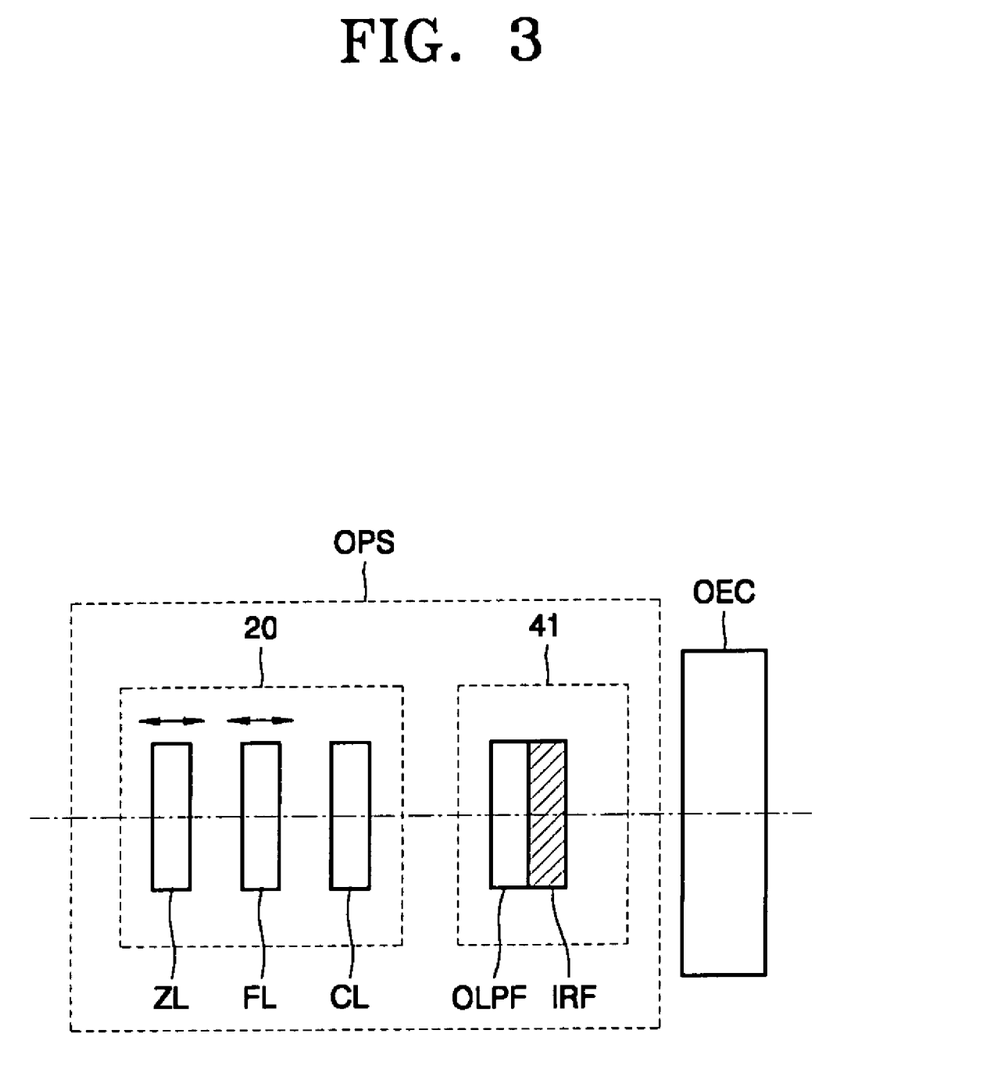
FIG. 3 is a schematic view illustrating an optical system of the digital camera of FIG. 1.
Figure 4:
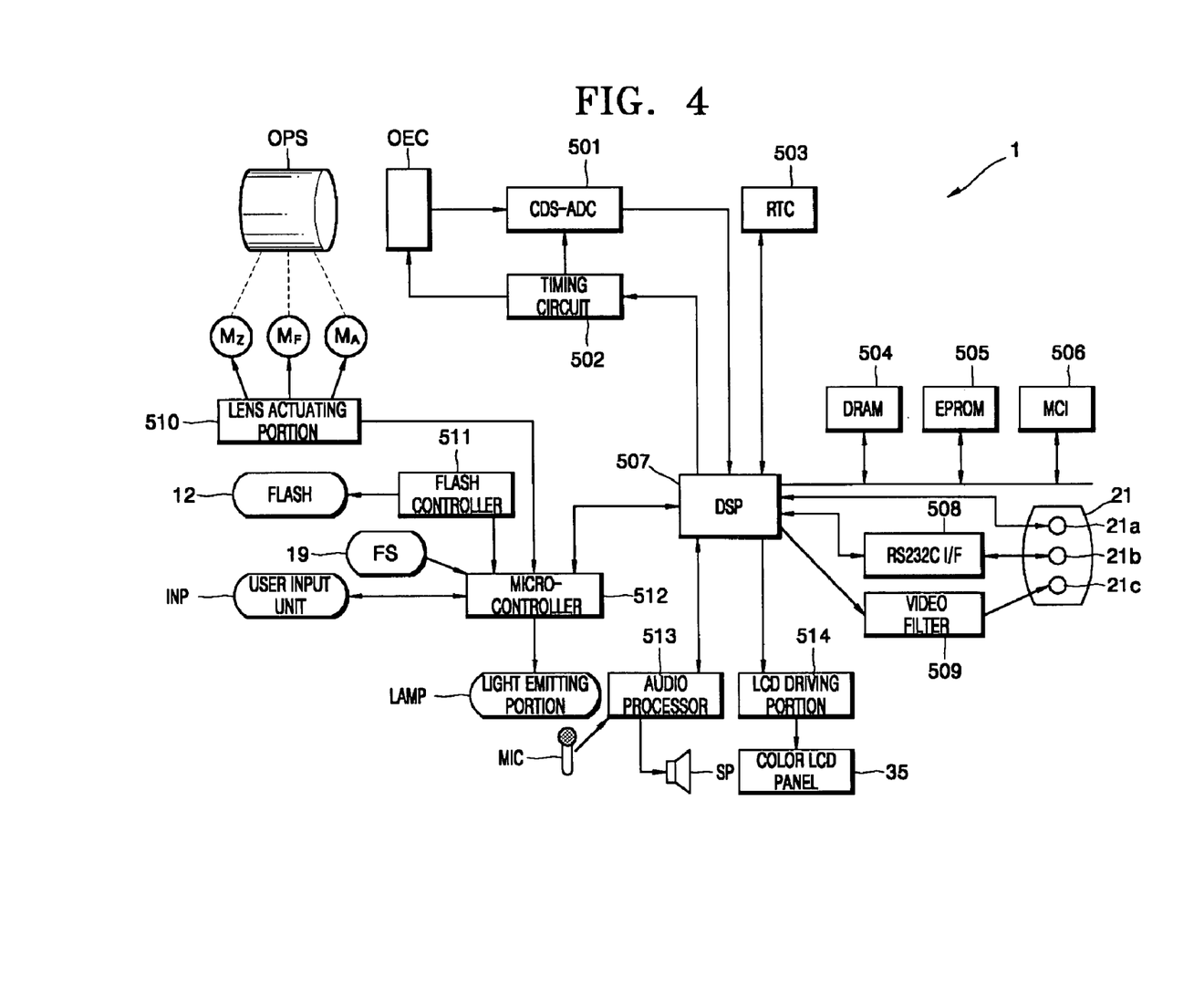
FIG. 4 is a block diagram of the digital camera of FIG. 1.
Figure 5:
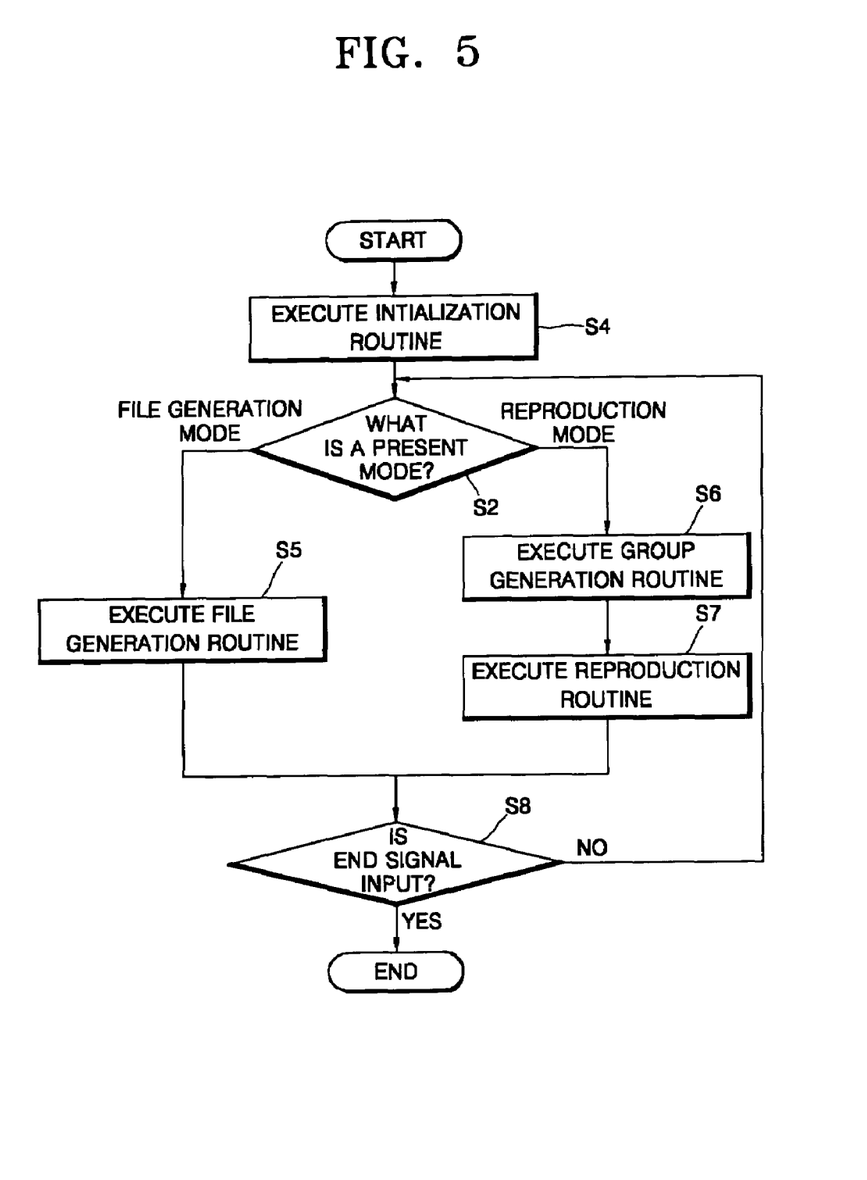
FIG. 5 is a flow chart illustrating a data-file management algorithm of the digital signal processor of FIG. 4.

FIG. 5 is a flow chart illustrating a data-file management algorithm of the digital signal processor of FIG. 4. Referring to FIGS. 1 through 5, the overall structure and operation of the digital camera 1 are described below.

When an operation power is applied from a power source to the digital camera 1, the DSP 507 executes an initialization routine S4 of the data-file management algorithm of FIG. 5. In the initialization routine S4, a particular directory for storing data-files is located among directories stored in a memory card (not shown) or any known recording medium, and the directory thus located is set as a present directory. If there is no such a particular directory looking for, a new directory is produced and set as a present directory. When the initialization routine S4 is completed, the following two alternative series of steps are executed depending upon a determination (S2) of what is then-present mode.

First, when a file generation mode signal (i.e., a photographing mode signal) is generated by the user through manipulation of the function selection button 15 in a user input portion INP, the DSP 507 executes a file generation routine S5 (i.e., a photographing routine) of FIG. 5. Here, the photographing mode signal can be a still image photographing mode signal, a night view photographing mode signal, or a motion picture photographing mode signal. In the file generation routine S5, representative voice files and data-files are generated and stored in a particular directory through manipulation by a user. Indices according to the order of generation of the representative voice files and the data-files are sequentially included in the names of the representative voice files and the data-files. Here, when a user presses the representative voice button 42 of the user input portion INP, a representative voice request signal for generating a new group and a representative voice file corresponding thereto is generated. In this case, the DSP 507 executes recording guide and recording, and thereby, generates a representative voice file (referring to steps S504 to S506 of FIG. 8).

Alternately, with reference to FIG. 5, when a reproduction mode signal is generated by the user through manipulation of the function selection button 15 in the user input portion INP, the DSP 507 executes a reproduction routine S7 after executing a group generation route S6. In the group generation routine S6, the data-files are grouped by units of their representative voice files based on the indices of the representative voice files and the data-files. In the reproduction routine S7, the representative data-files of each group generated in a particular directory are selectively displayed and a representative voice file corresponding to the group to which the representative data-file selected by the user belongs is reproduced. The file generation routine S5, the group generation routine S6, and the reproduction routine S7 are selectively and repeatedly executed until an end signal is input from the outside (Step S8).

As illustrated in FIG. 3, an optical system (OPS) including the lens portion 20 and a filter portion 41 optically processes light received from an object to be pictured. The lens portion 20 of the OPS includes a zoom lens ZL, a focus lens FL, and a compensation lens CL.

When a user presses the wide angle zoom button 39w or the telephoto zoom button 39t included in the user input portion INP, a signal corresponding thereto is input to a microcontroller 512. Accordingly, as the microcontroller 512 controls a lens actuating portion 510, a zoom motor $M_Z$ is driven so that the zoom lens ZL is moved. That is, when the wide angle zoom button 39w is pressed, the focal length of the zoom lens ZL decreases so that an angle of view increases. When the telephoto zoom button 39t is pressed, the focal length of the zoom lens ZL increases so that an angle of view decreases. According to this characteristic, the microcontroller 512 can obtain an angle of view with respect to the position of the zoom lens ZL based on the design data of the optical system OPS. Here, since the position of a focus lens FL is adjusted in a state in which the position of the zoom lens ZL is set, the angle of view is hardly affected by the position of the focus lens FL.

When the object to be pictured is automatically or manually focused the present position of the focus lens FL changes according to the position of the object to be pictured. Thus, the microcontroller 512 can obtain an object distance from design data, which is a distance between the object to be pictured and the focus lens FL. In an automatic focus mode, the focus motor $M_F$ is driven as the microcontroller 512 controls the lens actuating portion 510. As a result, the focus lens FL is moved from the foremost position toward the rearmost position, during which period the position of the focus lens FL, and thus, the number of driving steps of the focus motor $M_F$, are set where high frequency components of an image signal are maximized.

The compensation lens CL is not separately driven since it compensates for the overall refractive index. Reference letter $M_A$ denotes a motor for driving an aperture (not shown for purposes of simplicity and clarity).

In the filter portion 41 of the OPS, an optical low pass filter (OLPF) removes optical noise in high frequency components. An infrared cut filter (IRF) alternates infrared components in the input light.

An optoelectric converting portion (OEC) comprises a charge coupled device (CCD) or complementary metal-oxide-semiconductor (CMOS) to convert light received from the OPS to an electric analog signal. The DSP 507 controls the operation of the OEC and an analog-to-digital converting portion. A correlation double sampler and analog-to-digital converter (CDS-ADC) device 501 as the analog-to-digital converting portion processes an analog signal from the opto-electric converting portion OEC to remove high frequency noise and adjust amplitude thereof, and converts the processed analog signal to a digital signal. The DSP 507 controlled by the microcontroller 512 produces a digital image signal classified by a brightness signal and a chromaticity signal, by processing the digital signal from the CDS-ADC device 501.

A lamp portion (LAMP) driven by the microcontroller 512 includes a self-timer lamp 11, an auto-focus lamp 33, and a flash ready lamp 34. The user input portion INP includes the shutter button 13, the mode dial 14, the function section button 15, the function block button 18, the monitor button 32, the confirmation/deletion button 36, the enter/reproduction button 37, the menu button 38, the wide angle zoom button 39w, the telephoto zoom button 39t, the upward movement button 40up, the rightward movement button 40ri, the downward movement button 40lo, and the leftward movement button 40le.

The digital image signal from the DSP 507 is temporarily stored in a DRAM 504. An algorithm and set data needed for the operation of the DSP 507 is stored in an EPROM 505. A user's memory card is selectively engaged with or detached from a memory card interface 506.

A digital image signal from the DSP 507 is input to a LCD driving portion 514 so that an image is displayed on the color LCD panel 35.

The digital image signal from the DSP 507 can be transmitted through a USB (universal serial bus) connection portion 21a and an RS232C interface 508 and a connection portion 21b thereof, as a serial communication, and a video filter 509 and a video output portion 21c, as a video signal. The DSP 507 may include a microcontroller, for example, a ZR36410 device manufactured by Zoran, a U.S. company.

An audio processor 513 supplies a voice signal received from a microphone MIC to the DSP 507 or the speaker SP and outputs an audio signal to the speaker SP.

The microcontroller 512 drives a flash 12 by controlling the operation of a flash controller 511 according to a signal from a flash-light amount sensor 19.

Figure 6:
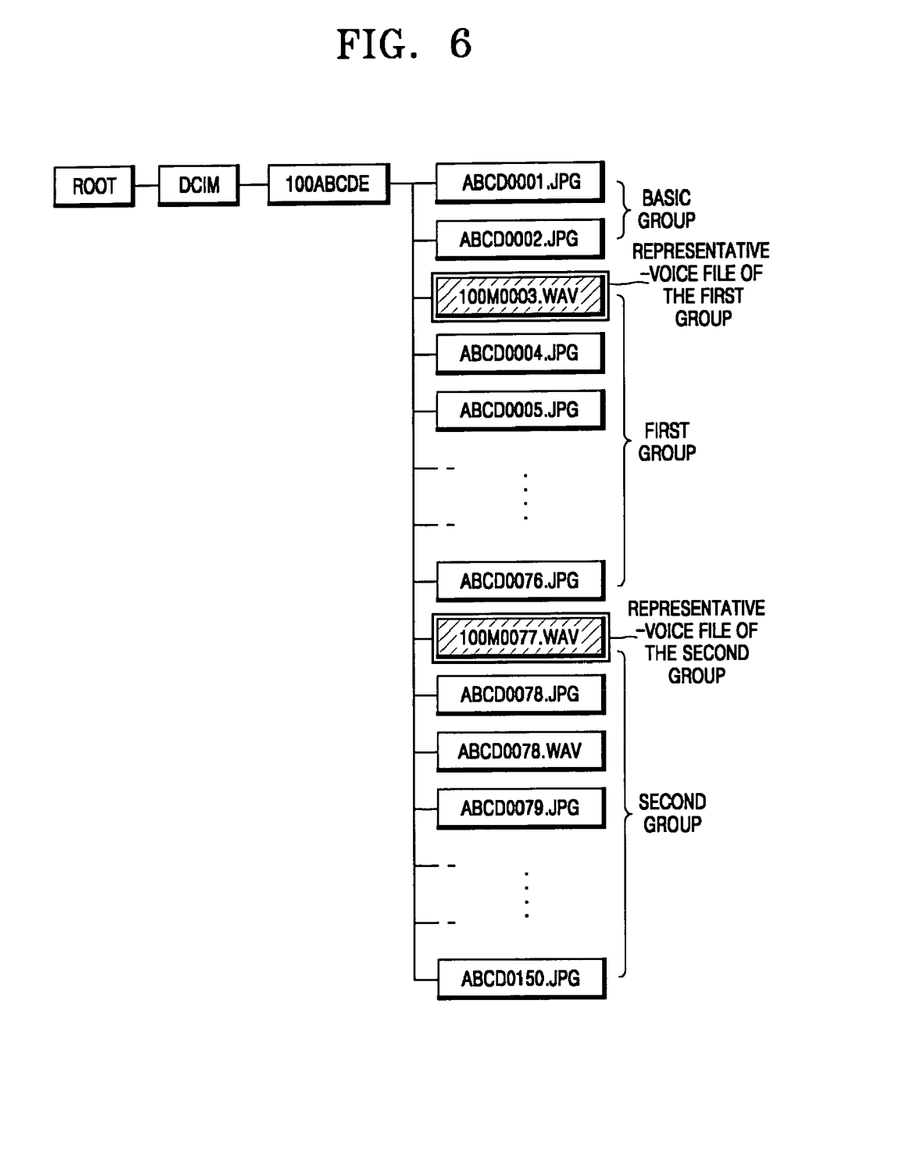
FIG. 6 is a block diagram illustrating the data-file management structure by execution of the algorithm of FIG. 5.

FIG. 6 shows a structure of data-file management according to execution of the algorithm of FIG. 5. As shown in FIG. 6, a grouping of the files is completed by execution of the group generation routine S6 according to the algorithm of FIG. 5. Referring to FIG. 6, a directory "DCIM" for storing user data-files is generated under the uppermost directory "ROOT" that is generated by formatting the memory card. A particular directory, for example, "100ABCDE" for storing data-files generated by the user's photographing and recording manipulation is generated under the directory "DCIM". The name of the particular directory, for example, "100ABCDE" includes an index "100" and a characteristic code "ABCDE". The characteristic code "ABCDE" is preferably named after the company who manufactured the portable digital apparatuses such as digital cameras.

In FIG. 6, files "100M0003.WAV" and "100M0077.WAV" are representative voice files of each group. By the execution of the file generation routine S5 of FIG. 5, the name of each representative voice file preferably includes a directory index of the particular directory (e.g., "100"), a characteristic code (e.g., "M"), and a data-file index according to the file generation order. For example, the name "100M0003.WAV" of a representative voice file of the first group includes a directory index "100" of the particular directory, a characteristic code "M", and a data-file index "0003" according to the file generation order. Also, the name "100M0077.WAV" of a representative voice file of the second group includes a directory index "100" of the particular directory, a characteristic code "M", and a data-file index "0077" according to the file generation order.

Also, by the execution of the file generation routine S5 of FIG. 5, the name of each data-file preferably includes a characteristic code (e.g., "ABCD") and a data-file index according to the file generation order. For example, the name of a data-file "ABCD0078.JPG" includes a characteristic code "ABCD" and a data-file index "0078". The characteristic code "ABCD" is preferably named after the company who manufactured the portable digital apparatuses such as digital cameras. As another example as shown in FIG. 6, after an image data-file, for example, "ABCD0078.JPG" is generated, a voice data-file, for example, "ABCD0078.WAV" is generated by recording, where the indices of these two data-files, that is, "0078", are identical (please refer to steps 508 through 513 of FIG. 8). This is because the voice data-file describes the image data-file so that the voice data-file is arranged to reproduce in subordination to the image data-file.

Thus, the grouped structure as shown in FIG. 6 can be completed by the execution of the group generation routine S6 of FIG. 5. For example, all data-files produced after a certain representative voice file "100M0003.WAV", that is, "ABCD0004"-"ABCD0076", are stored in one group until another representative voice file "100M0077.WAV" is stored. Other data-files having no preceding representative voice file, for example, "ABCD0001.JPG" and "ABCD0002.JPG", are included in a basic group.

Figure 7:
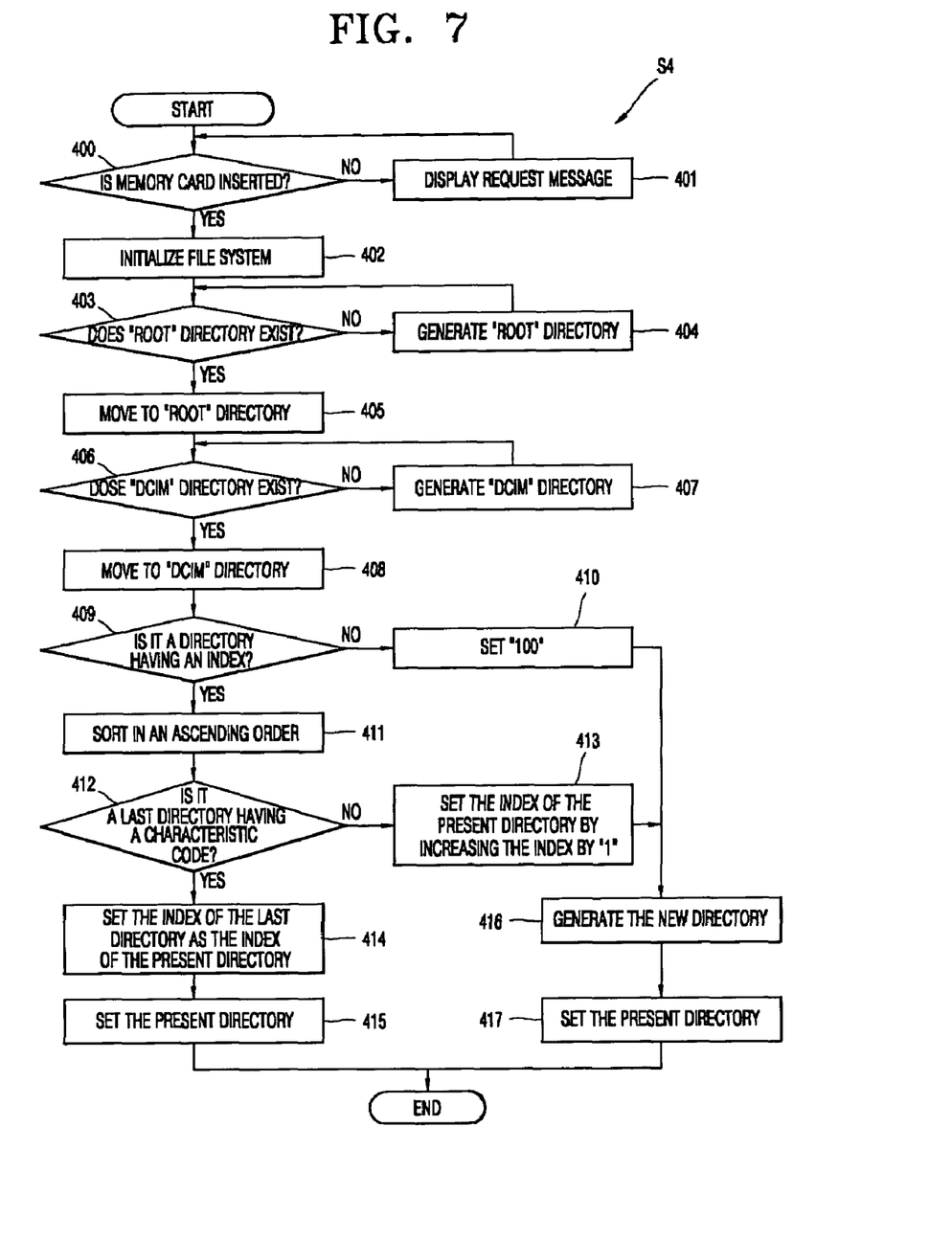
FIG. 7 is a flow chart illustrating an initialization routine of the algorithm of FIG. 5.

FIG. 7 illustrates the initialization routine S4 of the algorithm of FIG. 5, with additional reference to FIGS. 4 and 6.

First, whether a memory card is engaged with a memory card interface 506 is determined (Step 400). If the memory card is not engaged therewith, a message requesting insertion of a memory card is displayed on the color LCD panel 35 (Step 401). If the memory card is engaged therewith, a file system of the memory card is initialized (Step 402).

Next, whether there is an uppermost directory (e.g., "ROOT") generated by formatting the memory card is determined (Step 403). If no uppermost directory is present, an uppermost directory (e.g., "ROOT") is generated by formatting the memory card (Step 404). Then, the uppermost directory (e.g., "ROOT") is located (Step 405).

Next, whether a directory (e.g., "DCIM") for storing user data-files is present in the uppermost directory (e.g., "ROOT") is determined (Step 406). If the directory "DCIM", for example, is not present, such a directory "DCIM" is generated (Step 407). Then, the directory "DCIM" is located.

Next, whether a directory having an index is present in the directory "DCIM", for example, is determined (Step 409).

If no directory having an index exists in the directory "DCIM", for example, "100" is set as an index of the present directory (Step 410). Then, a new directory with the index is generated as a particular directory (Step 416), and the generated particular directory is set as a present directory (Step 417), and then the operation ends. In the new directory generation step 416, the name of the new directory includes the present directory index (e.g., "100") and the characteristic code (e.g., "ABCDE"). The characteristic code (e.g., "ABCDE") is preferably named after the company who manufactured the portable digital apparatuses such as digital cameras.

If at least one directory having an index exists in the directory "DCIM", the directories are sorted in the ascending order of the index (Step 411). Next, whether the characteristic code in the name of the last directory having the highest index matches the assigned characteristic code (e.g., "ABCDE") is determined (Step 412). If the characteristic code in the name of the last directory having the highest index does not match the assigned characteristic code (e.g., "ABCDE"), after the index of the present directory is set by increasing the highest index by "1" (Step 413), a new directory with the adjusted index is generated as a particular directory (Step 416). Then, the generated particular directory is set as a present directory (Step 417), and the operation ends. If the characteristic code in the name of the last directory having the highest index matches the assigned characteristic code (e.g., "ABCDE"), the last directory having the highest index is a particular directory for storing all of the data-files generated by the user's photographing and recording manipulation. Thus, after the index of the last directory is set as the index of the present directory (Step 414), the last directory having the index of the present directory is set as the present directory (Step 415), and then the operation ends.

Figure 8:
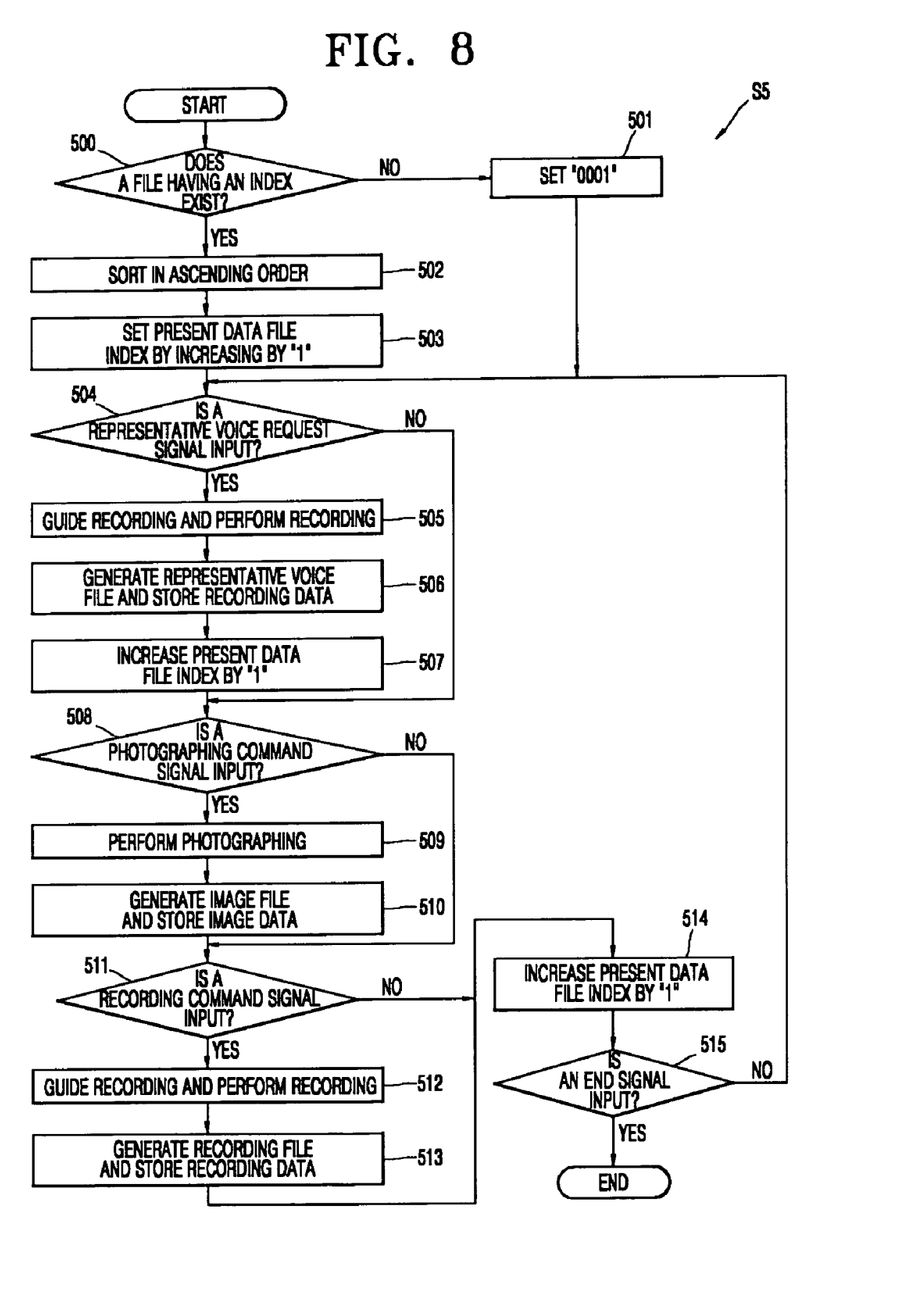
FIG. 8 is a flow chart illustrating a file generation routine of the algorithm of FIG. 5.

FIG. 8 illustrates a file generation routine S5 of the algorithm of FIG. 5. Referring to FIGS. 4, 6, and 8, the file generation routine S5 of FIG. 8 can be divided into three steps.

In a first step (Steps 500-503), "1" is added to the highest file index among the files stored in the present directory (i.e., the particular directory) and the adjusted index is set as the present data-file index. In the second step (Steps 504-507), a representative voice file to which the present data-file index is assigned is generated by the manipulation of the user, and then the present data-file index is again increased by "1". In the third step (Steps 508-514), at least one data-file to which the present data-file index is assigned is generated by the manipulation of the user, and then the present data-file index is increased by "1". Referring to FIGS. 4, 6, and 8, the steps of the file generation routine S5 of FIG. 8 are described in detail.

First, whether there is a name having an index is searched for among the names of the data-files in the present directory, that is, the particular directory (Step 500). If at least one name having an index does not exit, the present data-file index is set to "0001" (Step 501). If at least one name having an index exits, the data-files are sorted in ascending order of the index (Step 502) and the present data-file index is set by increasing the highest data-file index by "1" (Step 503). Accordingly, the data of the previously stored files can be maintained.

Next, when a representative voice request signal is input to the DSP 507 through the user input portion INP and the microcontroller 512 (Step 504), the DSP 507 controls the audio processor 513 and/or the LCD driving portion 514 to perform recording guide and record a voice describing a group of data-files to be produced by a user (Step 505). As an example of the group description, a message such as "pictures taken with friends, Hong and Han, at Surak Mountain on Apr. 15, 2002" can be recorded. Next, the DSP 507 generates a representative voice file and stores the recording data in the generated representative voice file (Step 506). Here, the name of the generated representative voice file preferably includes a present directory index, a characteristic code (e.g., "M"), and a data-file index according to the order of file generation. The present data-file index is increased by "1" (Step 507).

Next, when a photographing command signal is input to the DSP 507 through the user input portion INP and the microcontroller 512 (Step 508), the DSP 507 performs a photographing operation (Step 509). Next, an image file is generated as a user data-file and the image data is stored in the generated image file (Step 510). Here, the name of the generated image file includes the characteristic code such as "ABCD" and the present data-file index.

Likewise, when a recording command signal is input to the DSP 507 through the user input portion INP and the microcontroller 512 (Step 511), the DSP 507 controls the audio processor 513 and/or the LCD driving portion 514 to perform recording guide and record a voice describing an image file produced by the user (Step 512). As an example of the description of the image file, a message such as "A picture taken with friends, Hong and Han, at the peak of Surak Mountain" can be recorded. Next, the DSP 507 generates a recording file and stores the recording data in the generated recording file (Step 513). Here, the name of the generated recording file includes a characteristic code such as "ABCD" and a present data-file index. The present data-file index is increased by "1" (Step 514).

In Step 511, when the recording command signal is not input, the present data-file index is increased by "1" (Step 514).

The above-described steps after Step 504 are repeatedly performed until an external end signal is input, for example, the power is turned off or the present mode is switched to a reproduction mode (Step 515).

Figure 9:
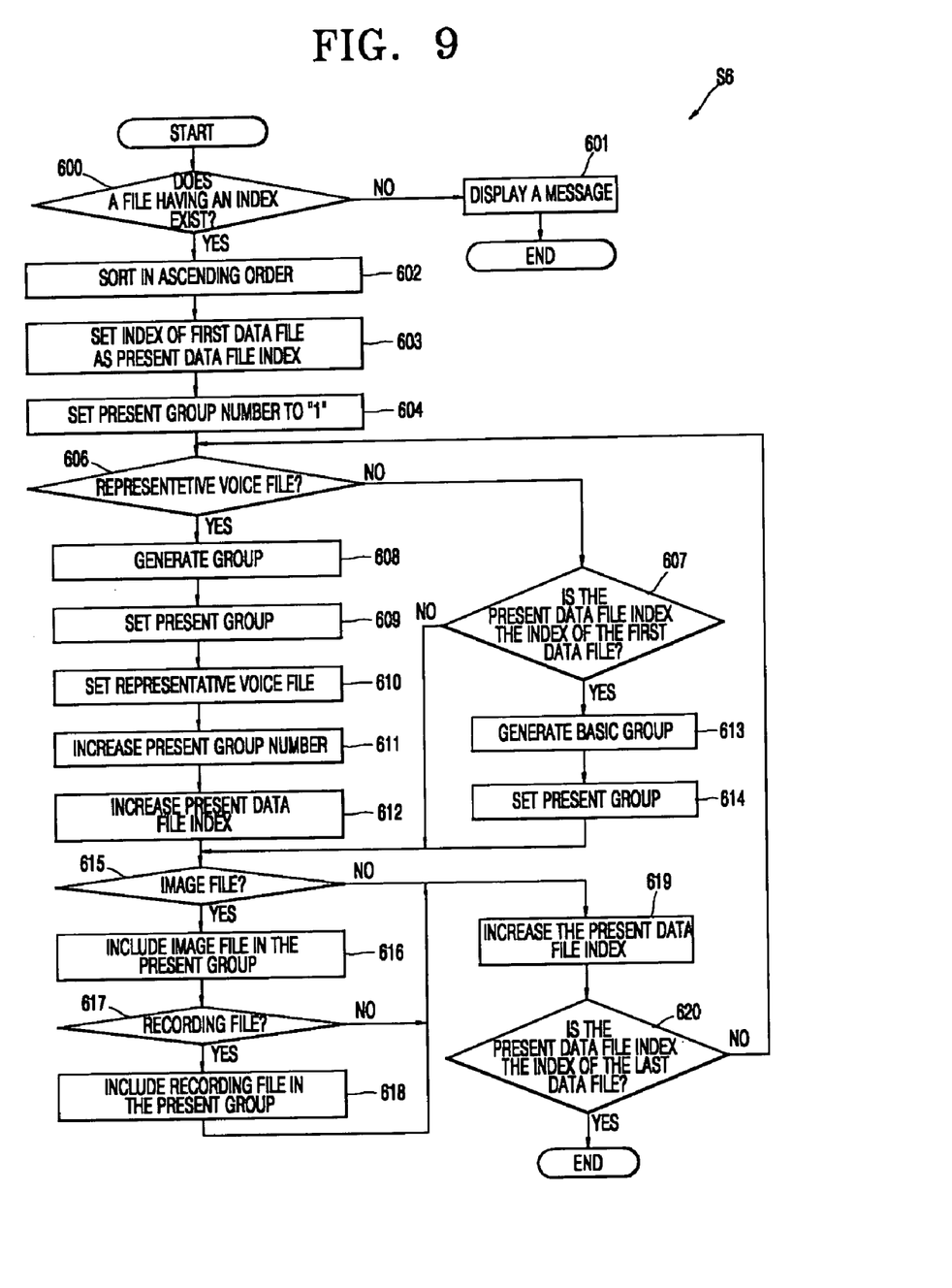
FIG. 9 is a flow chart illustrating a group generation routine of the algorithm of FIG. 5.

FIG. 9 shows the group generation routine S6 of the algorithm of FIG. 5. Referring to FIGS. 4, 6, and 9, the group generation routine S6 of FIG. 9 can be divided into 6 steps. In the first step (Steps 600 through 604), the lowest one of the indices of the files stored in the present directory, that is, a particular directory, is set as the present data-file index and the present group number is set to "1". In the second step (Steps 606 through 609), if a file having the present data-file index is a representative voice file, a group having the present group number is generated and the generated group is set as the present group. In the third step (Step 610), the representative voice file is set as a representative voice file of the present group. In the fourth step (Steps 611 and 612), the present group number and the present data-file index are increased by "1". In the fifth step (Steps 615 through 619), if a file having the present data-file index is a user data-file, the file having the present data-file index is included in the present group and the present data-file index is increased by "1". In the sixth step (Step 620), the second through fifth steps are repeated until the present data-file index becomes the highest index. Referring to FIG. 9, when the steps 606, 607, and 613 are consecutively performed, a basic group is generated. When the steps 606, 607, and 615 are consecutively performed, the user data-file is included in the group without generating a new group.

Referring to FIGS. 4, 6, and 9, the group generation routine S6 of FIG. 9 is described by each step as follows.

First, whether a data-file having a data-file index exists in the present directory (i.e., the particular directory) is determined (Step 600). If a data-file having a data-file index does not exist, a message notifying the fact is displayed (Step 601) and the program ends.

If a data-file having a data-file index exists, the data-files are sorted in ascending order according to their indices (Step 602). Next, a data-file having a minimum index, that is, an index of the first data-file, is set as the present data-file index (Step 603). Then, the present group number is set to "1" (Step 604).

Next, whether the name of a data-file having the present data-file index is a voice file and includes a directory index of the present directory, a corresponding characteristic code (i.e., "M"), and the present data-file index is determined (Step 606).

If the name of a data-file having the present data-file index includes the directory index of the present directory, the corresponding characteristic code (i.e., "M"), and the present data-file index, a group with the present group number is generated (Step 608) and the generated group is set as a present group (Step 609). The data-file having the present data-file index is set as a representative voice file of the present group (Step 610). The present group number and the present data-file index are respectively increased by "1" (Steps 611 and 612).

If in Step 606 the name of a data-file having the present data-file index does not include a directory index of the present directory, the corresponding characteristic code (i.e., "M"), and the present data-file index, whether the present data-file index is the index of the first data-file is determined (Step 607). Upon the determination, if the present data-file index is the index of the first data-file, a basic group is generated (Step 613) and the generated basic group is set as a present group (Step 614). Here, the number of the basic group is set to "0". On the other hand, if the present data-file index is not the index of the first data-file, which means that a present group is already set, the program goes to Step 615.

Next, whether the name of a data-file having the present data-file index is an image file and includes a corresponding characteristic code (i.e., "ABCD") and the present data-file index is determined (Step 615). If the name of a data-file having the present data-file index does not include the corresponding characteristic code such as "ABCD" and the present data-file index, the present data-file index is increased by "1" (Step 619). If the name of a data-file having the present data-file index includes the corresponding characteristic code such as "ABCD" and the present data-file index, the file is assigned to the present group (Step 616). Then, whether the name of a data-file having the present data-file index is a recording file and includes the corresponding characteristic code such as "ABCD" and the present data-file index, is determined (Step 617). If the name of a data-file having the present data-file index does not include the corresponding characteristic code ("ABCD") and the present data-file index, the present data-file index is increased by "1" (Step 619). If the name of a data-file having the present data-file index includes the corresponding characteristic code ("ABCD") and the present data-file index, the file is assigned to the present group (Step 618) and the present data-file index is increased by "1" (Step 619).

The above-described steps 606 through 619 are repeatedly executed until the present data-file index becomes the index of the last data-file (Step 620).

Figure 10:
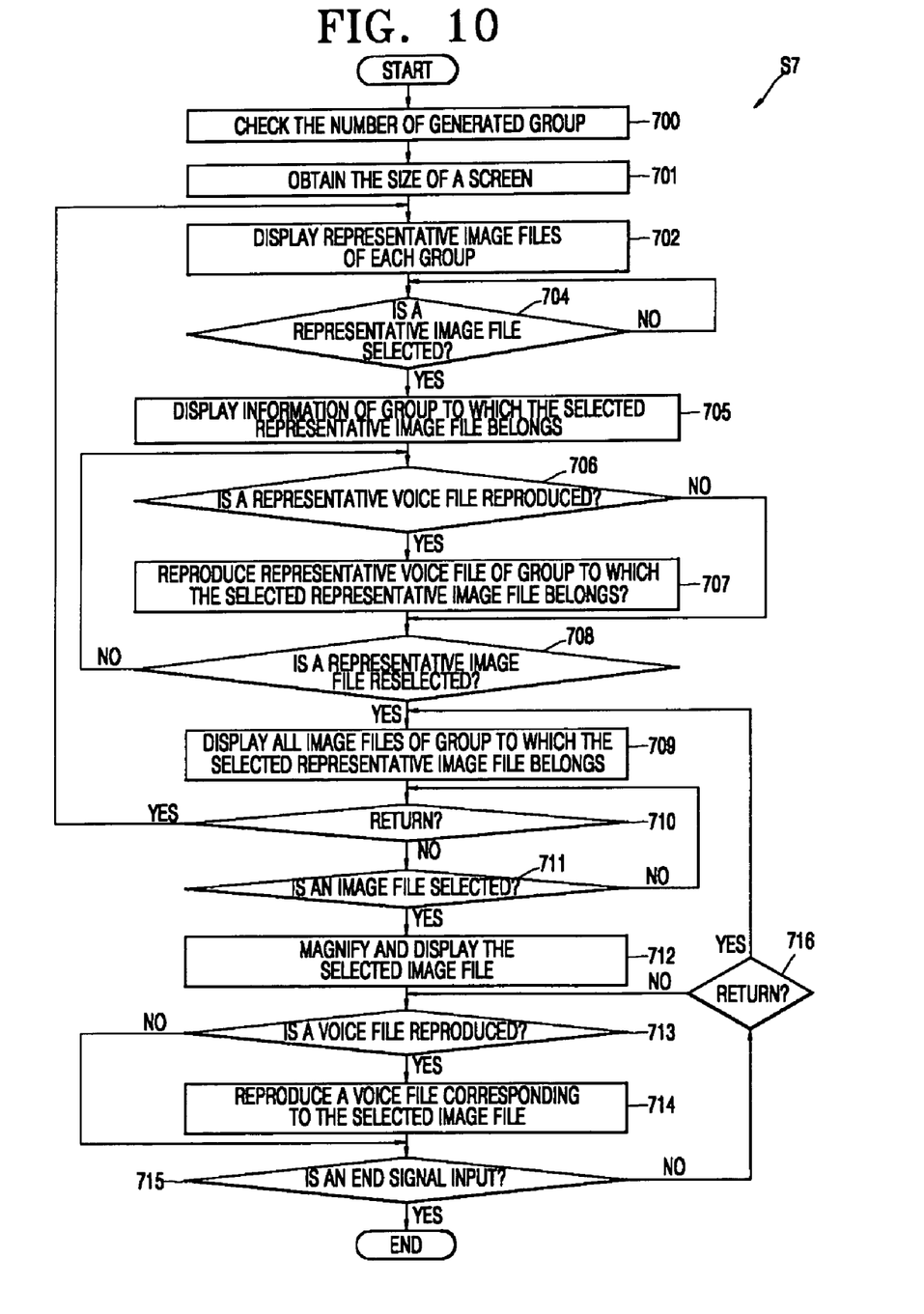
FIG. 10 is a flow chart illustrating a reproduction routine of the algorithm of FIG. 5.
Figure 11A:
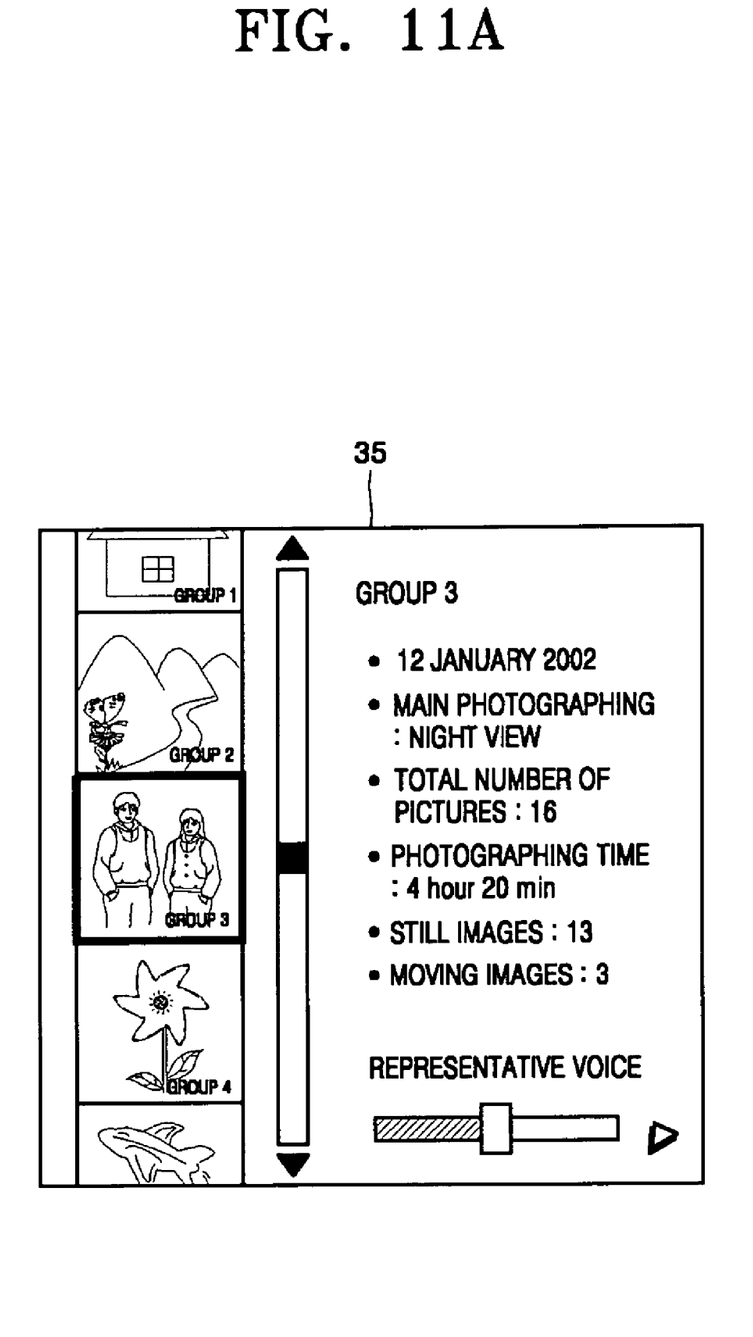
FIG. 11A is a view illustrating a screen of the color LCD panel shown in FIGS. 2 and 4 during the execution of step 707 of the reproduction routine of FIG. 10.
Figure 11B:
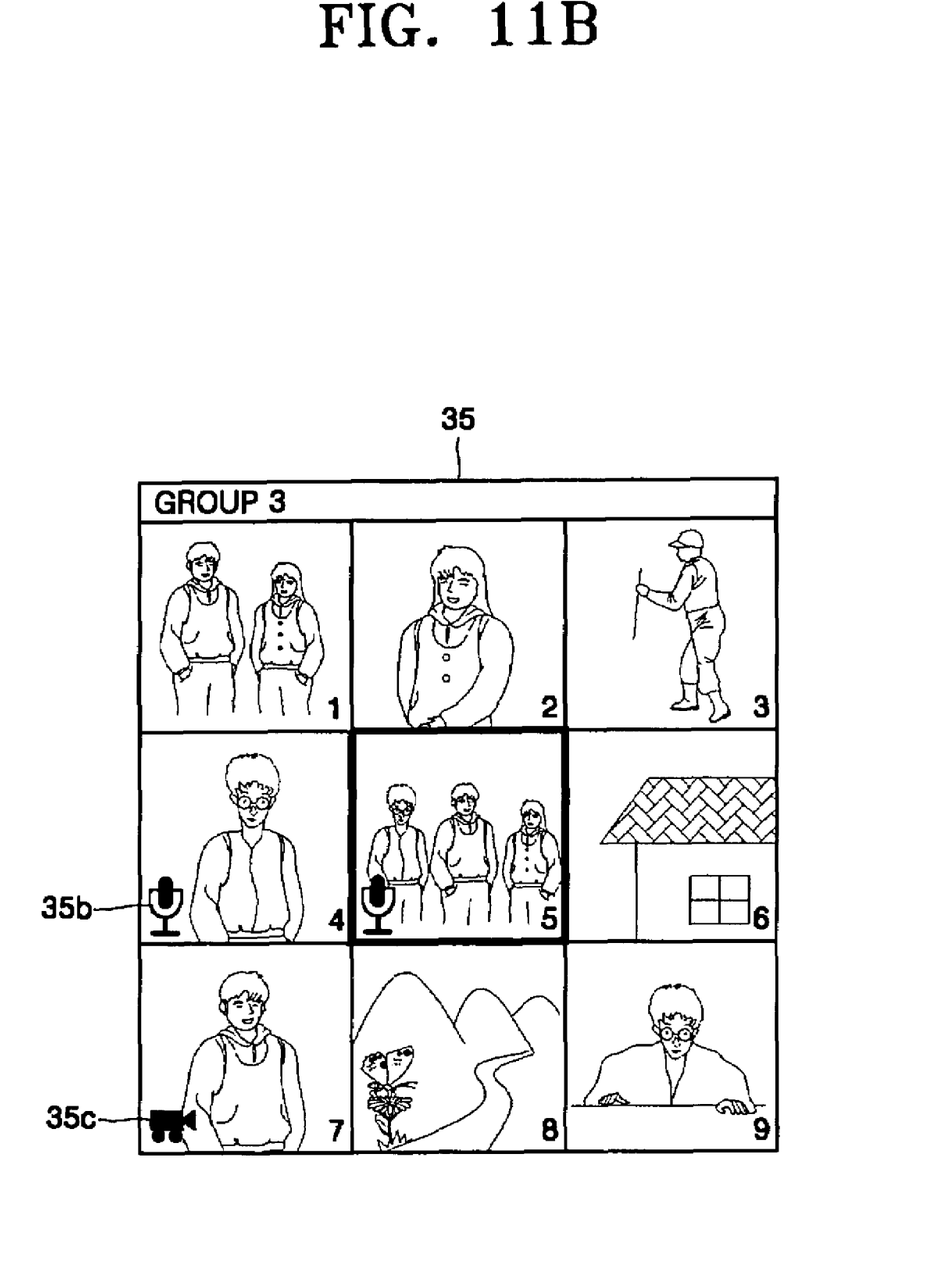
FIG. 11B s a view illustrating a screen of the color LCD panel shown in FIGS. 2 and 4 during the execution of step 711 of the reproduction routine of FIG. 10.
Figure 11C:
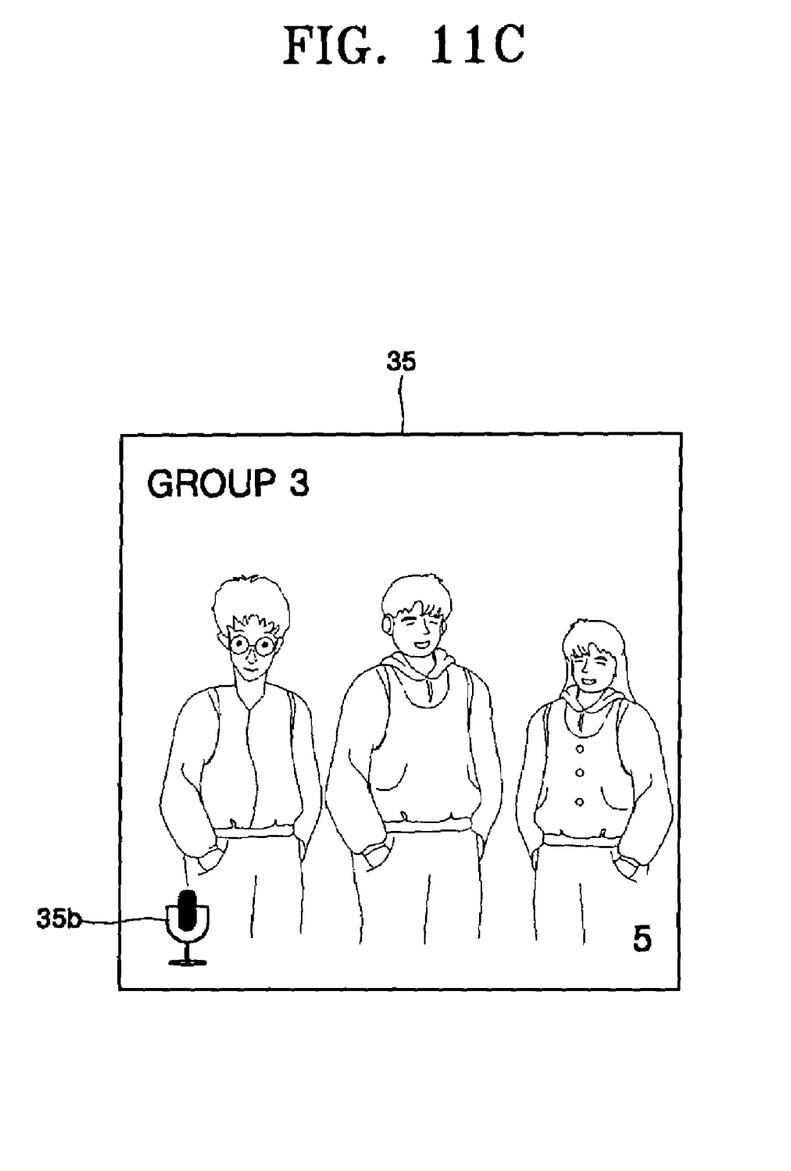
FIG. 11C s a view illustrating a screen of the color LCD panel shown in FIGS. 2 and 4 during the execution of step 712 of the reproduction routine of FIG. 10.

FIG. 10 shows the reproduction routine S7 of the algorithm of FIG. 5. FIG. 11A shows a screen of the color LCD panel 35 of FIGS. 2 and 4 at a point when Step 707 of the reproduction routine S7 of FIG. 10 is executed. FIG. 11B shows a screen of the color LCD panel 35 of FIGS. 2 and 4 at a point when Step 711 of the reproduction routine S7 of FIG. 10 is executed. FIG. 11C shows a screen of the color LCD panel 35 of FIGS. 2 and 4 at a point when Step 712 of the reproduction routine S7 of FIG. 10 is executed. Referring to FIGS. 4, and 10 through 11C, the reproduction routine S7 is described. That is, when a reproduction mode signal to selectively reproduce certain data-files is input from the user input portion INP, the DSP 507 executes the following data-file reproduction algorithm.

First, the number of groups generated according to the execution of the group generation routine of FIG. 9 is checked (Step 700). The size of the screen of the color LCD panel 35 is obtained (Step 701). The representative image files of each group stored in the memory card are displayed on the color LCD panel 35 (step 702).

Next, when a selection signal of a representative image file is input from the user input portion INP to the DSP 507 through the microcontroller 512 (step 704), information on a group to which the selected representative image file belongs is displayed on the color LCD panel 36 (Step 705, refer to FIG. 11A).

Next, when a signal for requesting reproduction of a representative voice file is input from the user input portion INP to the DSP 507 through the microcontroller 512 (step 706), the representative voice file of a group to which the selected representative voice file belongs is reproduced (Step 707). For example, a representative voice file having a content that "pictures taken with friends, Hong and Han, at Surak Mountain on 15 Apr. 2002" is reproduced. Alternatively, when a representative image file is selected, a representative voice file corresponding thereto can be automatically reproduced.

Next, when a signal to re-select a representative data-file is input from the user input portion INP (Step 708), all of the image files in a group to which the reselected representative image file belongs are displayed on the color LCD panel 35 (Step 709, refer to FIG. 11B). Here, if an image file (for example, the seventh file) is a motion picture file, an image at the first frame of the motion picture file is displayed together with a mark 35c indicating it is a motion picture file. Also, when a voice data-file corresponding to an image file (for example, the fourth or fifth file) is accompanied therewith, the image file is displayed together with a mark 35b indicating the information.

Next, when a screen return signal is input from the user input portion INP, the program returns to Step 702. Otherwise, the following steps are continuously executed (Step 710).

When a signal for selecting an image file is input from the user input portion INP (Step 711), the selected image file is magnified and displayed (Step 712, refer to FIG. 11C). When a signal for requesting reproduction of a voice file is input from the user input portion INP to the DSP 507 through the microcontroller 512 (Step 713), a voice file corresponding to the selected image file is reproduced (Step 714). For example, a representative voice file having a content that "a picture taken with friends, Hong and Han, at the entrance of Surak Mountain" is reproduced. Optionally, when an image file is selected and displayed, a voice file corresponding thereto can be automatically reproduced.

Next, when an end signal is input from the user input portion INP, the execution of the program ends (Step 715). Otherwise, whether a return signal is input from the user input portion INP is checked (Step 716). When the return signal is input, the program returns to Step 709. Otherwise, Step 713 is executed.

As described above, in the data-file management method according to the present invention, a particular directory is set as a present directory in an initialization step, an index according to the order of generation of representative voice files and data-files is assigned to each of the files in a file generation step, the data-files are grouped by unit of the representative voice file according to the index of the data-files in a group generation step, and the representative data-file and the representative voice file of each group are reproduced in a reproduction step. Accordingly, a user of a portable digital device can easily manage one's own data-files without using other devices. Also, the data-files of the user can be automatically or systematically grouped in the particular (i.e., corresponding) directory and reproduced.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of managing user data-files in a portable digital apparatus having a display device, and an interface for a recording medium, the method comprising the steps of:
generating representative voice files and data-files in a corresponding directory through manipulation by a user, each representative voice file for describing a group of the data-files to be stored in the corresponding directory, the representative voice files and data-files having respective names including sequentially arranged file indices based on the order of generation of the representative voice files and the data-files;
grouping the data-files into groups of files such that each respective group is associated with its representative voice file based on the file indices of the representative voice files and the data-files;
selectively displaying on the display device representative data-files of each of the groups in the corresponding directory;
locating the corresponding directory to store data-files among directories formed on the recording medium; and
setting the located corresponding directory as a present directory;
wherein the name of the corresponding directory includes a directory index and a characteristic code therein;
wherein by the file generation step, the name of each of the representative voice files includes the directory index of the corresponding directory, a characteristic code, and a data-file index;
wherein by the file generation step, the name of each of the data-files includes a characteristic code and a data-file index;
wherein the file generation step comprises the steps of:
increasing the highest index of the indices of the files stored in the corresponding directory by "1" to set the increased index as a present data-file index (i.e., a first step);
generating a representative voice file to which the present data-file index is assigned, according to manipulation by the user, and increasing the present data-file index by "1" (i.e., a second step); and
generating at least one data-file to which the present data-file index is assigned according to manipulation by the user and increasing the present data-file index by "1" (i.e., a third step).

2. The method as claimed in claim 1, wherein in the second step, the representative voice file is generated by performing the steps of:

if the user inputs a representative voice request signal, performing recording by guiding the user to record a representative voice; and
generating a representative voice file to which the present data-file index is assigned and storing the recorded data in the generated representative voice file.

3. A method of managing user data-files in a portable digital apparatus having a display device, and an interface for a recording medium, the method comprising the steps of:
generating representative voice files and data-files in a corresponding directory through manipulation by a user, each representative voice file for describing a group of the data-files to be stored in the corresponding directory, the representative voice files and data-files having respective names including sequentially arranged file indices based on the order of generation of the representative voice files and the data-files;
grouping the data-files into groups of files such that each respective group is associated with its representative voice file based on the file indices of the representative voice files and the data-files;
selectively displaying on the display device representative data-files of each of the groups in the corresponding directory;
locating the corresponding directory to store data-files among directories formed on the recording medium; and
setting the located corresponding directory as a present directory;
wherein the name of the corresponding directory includes a directory index and a characteristic code therein;
wherein by the file generation step, the name of each of the representative voice files includes the directory index of the corresponding directory, a characteristic code, and a data-file index;
wherein by the file generation step, the name of each of the data-files includes a characteristic code and a data-file index;
wherein the group generation step comprises the steps of:
setting a lowest one of the indices of the files stored in the corresponding directory as a present data-file index and setting a present group number as "1" (i.e., a first step);
if a file having the present data-file index is a representative voice file,
generating a group having the present group number and setting the generated group as a present group (i.e., a second step);
setting the representative voice file as a representative voice file of the present group (i.e., a third step);
increasing the present group number and the present data-file index by "1" (i.e., a fourth step);
if a file having the present data-file index is a user data-file, including the file having the present data-file index in the present group and increasing the present data-file index by "1" (i.e., a fifth step); and
repeating the second through fifth steps until the present data-file index is the highest index (i.e., a sixth step).

* * * * *